US00RE34175E

United States Patent [19]

Grimes et al.

[11] E Patent Number: Re. 34,175

[45] Reissued Date of Patent: Feb. 9, 1993

[54] FLOAT SWITCH ASSEMBLY

[76] Inventors: Richard V. Grimes, P.O. Box 304; John W. Good, 10010 N. 25 A, both of Piqua, Ohio 45356

[21] Appl. No.: 793,072

[22] Filed: Nov. 15, 1991

Related U.S. Patent Documents

Reissue of:

[64] Patent No.: 4,644,117
Issued: Feb. 17, 1987
Appl. No.: 780,320
Filed: Sep. 26, 1985

[51] Int. Cl.[5] ..... H01H 35/18

[52] U.S. Cl. ..... 200/84 R; 73/308; 200/61.52; 200/82 C; 417/40

[58] Field of Search ..... 417/40, 211.5; 340/623, 340/625; 73/308, 313; 200/82 R, 82 C, 84 R, 84 C, 85 R, 61.52, 61.45 R, 61.45 M, 549, 551, 573, 553; 307/118

[56] References Cited

U.S. PATENT DOCUMENTS

| | | | |
|---|---|---|---|
| 3,026,387 | 3/1962 | Ashbaugh | 200/82 C |
| 3,483,341 | 12/1969 | Reichensperger | 200/84 R |
| 3,944,770 | 3/1976 | Pepper | 200/84 R |
| 4,021,144 | 5/1977 | Matsusaka | 417/40 |
| 4,084,073 | 4/1978 | Keener | 200/84 R |
| 4,215,975 | 8/1980 | Niedermeyer | 417/53 |
| 4,302,641 | 11/1981 | Johnston | 200/84 R |
| 4,373,155 | 2/1983 | Dola | 200/84 R |
| 4,378,475 | 3/1983 | McNeil | 200/61.45 M |
| 4,629,841 | 12/1986 | Riback | 200/61.52 |
| 4,692,576 | 9/1987 | Freed | 200/84 R |

*Primary Examiner*—Gerald P. Tolin
*Attorney, Agent, or Firm*—Jacox & Meckstroth

[57] ABSTRACT

A hollow float bulb or shell is secured to a flexible electrical cord and encloses a housing which confines an electrical switch and defines a chamber with an inwardly projecting barrier. A weight member in the form of a metal ball is disposed within the chamber and rolls over the barrier to actuate the switch in response to tilting movement of the shell and housing. In one embodiment, a shuttle in the form of a metal frame is supported within the chamber for sliding movement and carries a switch conductor element. The shuttle frame is impacted by the ball located within the frame when the ball rolls over the barrier, and the frame is restrained by magnets to produce snap actuation of the switch.

18 Claims, 2 Drawing Sheets

FLOAT SWITCH ASSEMBLY

Matter enclosed in heavy brackets [ ] appears in the original patent but forms no part of this reissue specification; matter printed in italics indicates the additions made by reissue.

BACKGROUND OF THE INVENTION

In the art of controlling a submersible pump with a float switch assembly, for example, as disclosed in U.S. Pat. Nos. 4,215,975 and 4,302,641, it is common to use a hollow float bulb or shell which is adapted to float on the surface of the water or liquid being pumped. The shell is attached to the outer free end of a flexible electrical cord which conducts the power for operating the pump. The float bulb or shell is fluid-tight and encloses a control switch which moves between closed and open positions in response to tilting of the float shell as the liquid level changes between predetermined upper and lower limits.

Usually, the control switch consists of a mercury actuated switch such as disclosed in above mentioned U.S. Pat. No. 4,215,975. However, the commonly used mercury switches are limited in the amount of current which they can conduct, and this limits the size of the electric pump motor which can be controlled directly by a mercury switch. In addition, there is an environmental problem when it is desired to disposed of a mercury switch which has failed and been replaced. Thus in place of a mercury switch, it has been proposed to use a reed-type switch which is actuated by a permanent magnet movable in response to tilting of the float shell, for example, as disclosed in U.S. Pat. No. 4,021,144. However, such a reed switch is also limited in the amount of electrical current which it can effectively conduct and is not suitable for use in controlling relatively large horsepower submersible pumps.

SUMMARY OF THE INVENTION

The present invention is directed to an improved float switch assembly which is ideally suited for use in controlling an electric motor driving a pump and which is adapted to float on the surface of the liquid being pumped for sensing changes in the level of the surface. The switch assembly of the invention is especially suited for controlling a submersible pump motor of substantial horsepower and provides for snap actuation of the switch in order to minimize arcing between the contacts of the switch. Thus the switch assembly of the invention provides for dependable operation without maintenance over an extended period of use and is especially suitable for controlling a motor driven pump which must limit the maximum liquid level within a tank or chamber.

In accordance with one embodiment of the invention, a float switch assembly includes a hollow float bulb or shell which encloses a housing molded of a plastics material. The housing confines an electrical control switch and defines a chamber which receives a weight member in the form of a metal ball. A barrier projects inwardly into the chamber, and the ball rolls over the barrier to produce snap actuation of the switch. In accordance with a modification of the invention, the housing supports the frame-shaped metal shuttle which shifts axially within the housing and confines the ball for predetermined relative movement. The shuttle carries a switch conducting element which closes and opens the switch when the shuttle moves within the housing in response to impacts by the ball due to tilting of the housing and the surrounding float shell. The shuttle is retained in the switch closed position by magnetic elements which are supported by the housing.

Other features and advantages of the invention will be apparent from the following description, the accompanying drawings and the appended claims.

DESCRIPTION OF THE PREFERRED EMBODIMENTS

Figure 1:
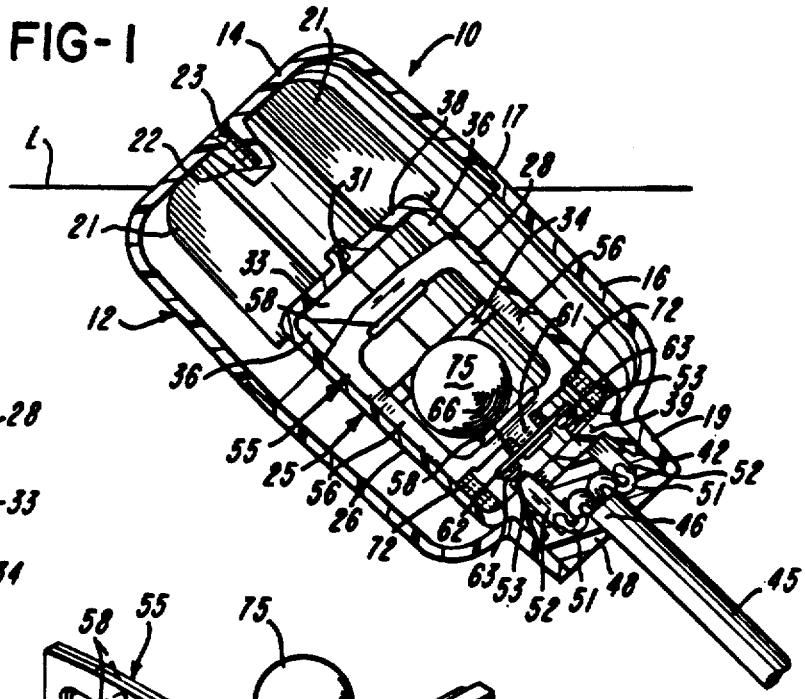
FIG. 1 is an axial section of a float switch assembly constructed in accordance with the invention and showing the switch in its closed position.
Figure 2:
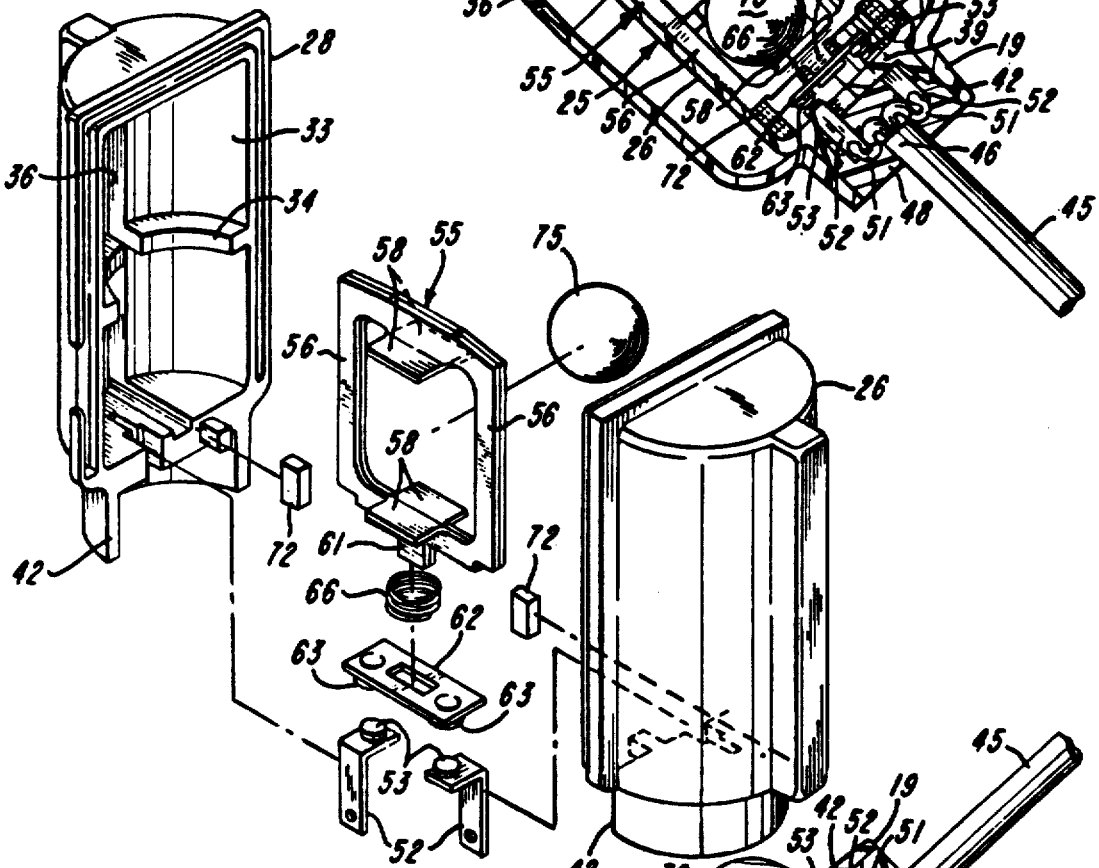
FIG. 2 is an exploded perspective view of the internal components of the switch assembly shown in FIG. 1.

A switch assembly 10 is illustrated in FIG. 1 and includes a float bulb or shell 12 formed by an outer bulb section 14 coupled to an opposing inner bulb section 16 both molded of a rigid plastics material. The sections 14 and 16 include interfitting annular portions which are cemented together to form a fluid-tight joint 17. The inner section 16 of the float shell 12 includes an outwardly projecting annular hub portion 19, and the outer section 14 includes four annularly spaced ribs 21 and an inwardly projecting center boss 22. The boss 22 defines an axial hole 23 which is adapted to receive a self-tapping screw, as will be explained later.

The float shell 12 encloses a generally cylindrical housing 25 which is formed by two mating housing sections 26 and 28 molded of a rigid plastics material and joined together by cement to form a fluid-tight joint 31. The housing sections 26 and 28 define a generally cylindrical internal chamber 33 and have an inwardly projecting and circumferentially extending rib which forms a generally annular barrier 34. The housing sections 26 and 28 also define two diametrically opposed and axially extending slots or grooves 36 which interrupt the rib or barrier 34. The slots 36 extend from an outer end wall 38 of the housing 25 to an inner end wall 39. A cylindrical wall 42 projects axially from the inner wall 39 of the housing 25 and press fits into the annular hub portion 19 of the float shell 12 so that the hub portion 19 supports the inner end portion of the housing 25 within the shell 12. The outer end portion of the housing 25 is supported by the ribs 21 which conform to the shape of the housing, and all of the sections of the housing and shell are cemented together after the switch components are assembled within the housing 25.

A flexible electrical power conducting cord 45 has one end portion 46 connected to the switch assembly 10 by an adhesive potting material 48, confined within the annular walls 19 and 42. The cord 45 has a pair of wire conductors 51 which are soldered or clamped to corresponding sheet metal conductors 52. The conductors are supported by corresponding slots formed within the end wall 39 of the housing 25, and a switch contact element 53 is rigidly secured to the inner end portion of each sheet metal conductor 52.

A frame-like switch actuator or shuttle 55 is supported by the housing 25 for axial sliding movement. The shuttle 55 is formed by two sheet metal parts or stampings which are spot-welded together and have outer diametrically opposed leg portions 56 which are slidable within the corresponding slots 36 to provide for sliding axial movement of the shuttle 55. Each of the sheet metal parts forming the shuttle 55 includes a pair of outwardly projecting flanges or tabs 58 which cooperate to form opposing end walls or surfaces for the shuttle 55. The inner end portion of the shuttle 55 includes welded together flat tabs 61 which receive and slidably support a rectangular sheet metal conductor plate 62. The conductor plate 62 carries a pair of switch contact elements 63 which oppose the contact elements 53, and the outer ends of the tabs 61 are deformed to retain the conductor plate 62. A compression spring 66 surrounds the tabs 61 and normally urges the conductor plate 62 outwardly on the tabs 61.

A pair of cylindrical permanent magnets 72 are cemented into the forward end portions of the slots 36 and are effective to retain the shuttle 55 in its forward or switch closed position, as shown in FIG. 1. In this position, the sheet metal conductors 52 are electrically connected by the sheet metal conductor plate 62 through the contacts 53 and 63. A weight member in the form of a stainless steel ball 75 is enclosed within the chamber 33 of the housing 25 and is confined within the frame-like shuttle 55 for rolling movement over the rib or barrier 34. The ball 75 alternately engages the opposing parallel walls or tabs 58 at opposite ends of the shuttle 55 as the ball rolls back and forth across the barrier 34.

Figure 3:
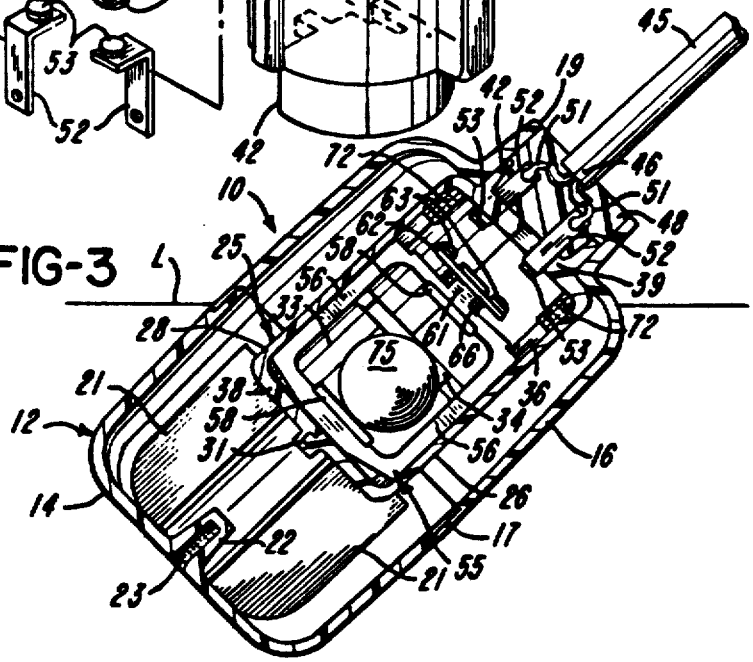
FIG. 3 is a section of the switch assembly similar to FIG. 1 and illustrating the switch in its open position.

The operation of the switch assembly 10 is apparent from FIGS. 1 and 3. When the liquid level L being sensed by the switch assembly 10 rises to a predetermined elevation, the switch assembly tilts upwardly to a predetermined acute angle relative to a horizontal plane. In this position, the ball 75 rolls over the barrier 34 and impacts the inner tabs 58 of the shuttle 55. This causes the shuttle to move inwardly until the contacts 63 on the conductor plate 62 engage the contacts 53 on the conductors 52 to close the switch and complete the circuit between the wire conductors 51. The closing of the switch energizes the pump motor for removing the liquid from the container or chamber which receives the pump and switch assembly 10.

As the liquid level L descends and reaches a predetermined lower elevation the switch assembly 10 tilts to a downwardly inclined position, as shown in FIG. 3. In this position, the ball 75 rolls over the barrier 34 again and impacts the tabs 58 on the outer end of the shuttle 55. This impact is effective to pull the shuttle from the magnets 72 and to separate the switch conductor plate 62 and contacts 63 so that the switch moves to its open position, as shown in FIG. 3. When the water or liquid level L rises again to the upper elevation, as shown in FIG. 1, the switch closes, and the cycle is repeated.

Figure 4:
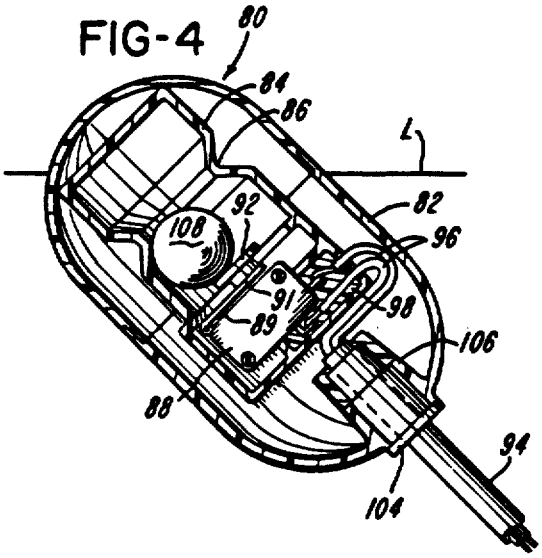
FIG. 4 is an axial section, similar to FIG. 1, of a float switch assembly constructed in accordance with a modification of the invention and with the switch in its closed position.
Figure 5:
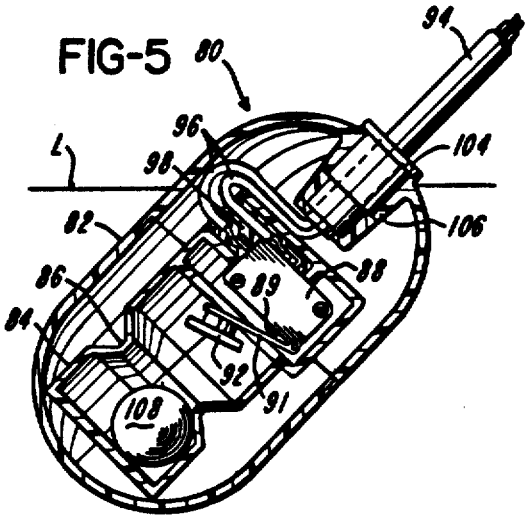
FIG. 5 is another axial section of the switch assembly shown in FIG. 4 and illustrating the switch in its open position.

Referring to FIGS. 4 and 5 which show somewhat diagramatically another switch assembly 80 constructed in accordance with the invention, a float shell 82 is constructed in the same manner as the shell 12 described above and encloses a generally cylindrical housing 84 having an inwardly projecting circumferential rib forming a barrier 86. The housing 84 also encloses and confines a microswitch 88 having an actuator button 89 operated by a pivotal lever 91 which carries a circular pad 92. An electrical cord 94 has a pair of flexible wire conductors 96 which extend to the switch 88, and the connecting end portions of the conductor 96 are sealed within an enclosed corner portion of the housing 84 by a potting material 98.

The cord 94 is secured to the shell 82 by a resilient tubular plug 104 which extends into an inwardly projecting hub portion 106 of the shell 82. A weight member in the form of a stainless steel ball 108 is confined within the housing 84 and rolls back and forth across the internal barrier 86 in response to tilting of the float shell 82 with changes in the level L of the surface of the liquid being sensed by the float switch assembly 80.

When the bulb or shell 82 tilts upwardly (FIG. 4), the ball 108 rolls over the barrier 86 and engages the pad 92 on the switch actuating lever 92 to close the switch 88. When the switch 88 tilts downwardly to the position shown in FIG. 5, the ball 108 rolls over the barrier 86 to the outer end portion of the housing 84, and the switch 88 is released to move to its open position. The embodiment shown in FIGS. 4 and 5 utilize a commercially available microswitch 88 which simplifies the construction of the assembly 10, but the switch 88 is not capable of handling the larger electrical load or current which may be handled by the float switch assembly 10.

Figure 6:
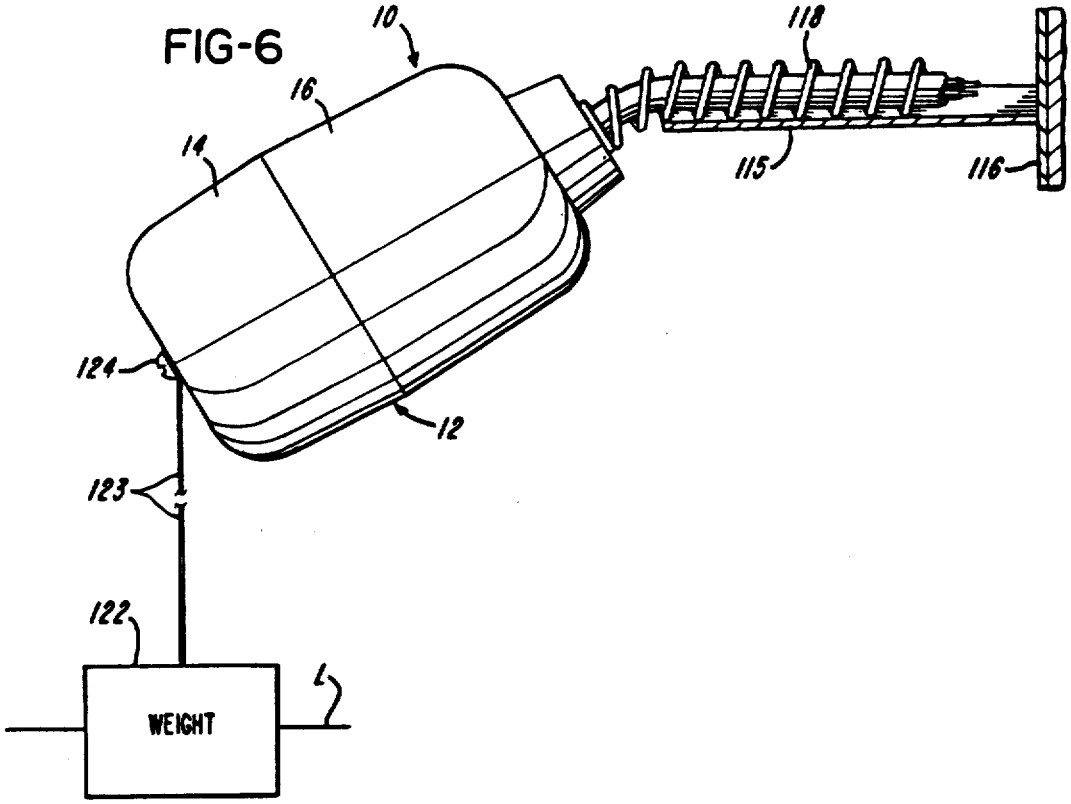
FIG. 6 s an elevational view of the switch assembly shown in FIGS. 1 and 2 and illustrating its support and use for sensing liquid levels with in a small diameter tank or chamber.

Referring to FIG. 6, the float switch assembly 10 or 80 may be used for sensing changes in the liquid level which is controlled by the length of line between weight member 122 and the switch assembly 10. In this embodiment, the float switch assembly 10 is positioned adjacent the desired upper level of liquid within the tank or chamber and is supported by a V-shaped arm 115 secured to a wall or post 116. A helical compression or tension spring 119 surrounds the cord 45 and has an inner end portion supported by the arm 115. The outer end portion of the spring 118 projects outward from the arm 115 and allows the switch assembly 10 to pivot or tilt between an upwardly inclined closed position, as shown in FIG. 1, and a downwardly inclined open position, as shown in FIG. 6. A buoyant weight member 122 is attached to the outer end of the switch assembly 10 by a flexible line 123, and the upper end of the line 123 is secured to the outer end of the shell 12 by a screw 124 threaded into the hole 23.

As the liquid level is dropping within the chamber containing the switch assembly 10 supported as shown in FIG. 6, the coil spring 118 has sufficient strength to hold the switch assembly 10 in a horizontal position as the liquid level drops below the switch assembly. When the liquid level L drops to an elevation where the weight member 122 projects above the liquid level, the weight member 122 begins to drop with the liquid level. The line 123 pulls downwardly on the outer end of the switch assembly 10 and bends the spring 118 (FIG. 6) until the switch assembly is tilted to its downwardly inclined position wherein the switch opens. The size and weight of the weight member 122 are selected to produce the desired actuation of the switch assembly 10, as described above.

From the drawings and the above description, it is apparent that a switch assembly constructed in accordance with the present invention, provides desirable features and advantages. For example, the construction of the switch assembly 10 results in producing snap actuation of the switch contacts 53 and 63 in response to tilting movement of the float shell 12 so that arcing between the contacts is minimized. This permits the switch assembly to handle a substantially high current so that the switch assembly is capable of controlling a pump motor having substantial horsepower. The positive actuation of the shuttle 55 in response to impact by the ball 75 also assures positive opening and closing of the switch contacts so that the switch assembly provides dependable operation for years of service.

The same dependable operation is provided by the embodiment shown in FIGS. 4 and 5 since the rolling movement of the ball 108 over the barrier 88 produces positive actuation of the lever 91 of the microswitch 88. As apparent in FIG. 4, when the switch assembly 80 is in its closed position, the ball 108 continuously presses against the lever 91 as a result of the cam surface provided by the barrier 86. This closing pressure is also produced by the ball 75 (FIG. 1) in the float switch assembly 10 to assure that the contacts 63 remain in positive engagement with the contacts 53 when the switch assembly is closed.

While the forms of switch assembly herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. A float switch assembly adapted to float on a liquid surface and to sense changes in the level of the surface for controlling a pump, said assembly comprising a housing defining a chamber, means connected to said housing and forming a barrier projecting into said chamber, a set of electrical conductors extending to said housing, a shuttle supported within said housing for linear movement, switch means within said housing and including an electrical conducting element movable by said shuttle between a closed position connecting said conductors and an open position, a weight member disposed within said chamber for movement over said barrier, means for moving said shuttle and operating said switch means conducting element between said open and closed positions in response to tilting movement of said housing and movement of said weight member over said barrier, *said barrier urging said weight member against said shuttle in said closed position*, and means for floating said housing on the liquid surface.

2. A float switch assembly as defined in claim 1 wherein said weight member comprises a ball, and said barrier comprises a generally annular portion of said housing.

3. A float switch assembly as defined in claim 1 wherein said floating means comprise a hollow float shell surrounding said housing, and said shell includes means supporting said housing within said shell.

4. A float switch assembly as defined in claim 1 wherein said shuttle comprises a frame surrounding said weight member, and said weight member comprises a ball disposed within said frame for relative movement.

5. A float switch assembly as defined in claim 4 and including magnetic means supported by said housing for retaining said frame in a position corresponding to said switch means in said closed position.

6. A float switch assembly as defined in claim 5 wherein said magnetic means comprise a pair of spaced permanent magnets disposed within opposing slots supporting said frame for linear movement.

7. A float switch assembly as defined in claim 1 and including means for tilting said housing after the liquid surface drops substantially below said housing.

8. A float switch assembly as defined in claim 2 wherein said shuttle comprises a frame defining an openng therein, said barrier projects towards said opening, and said ball is disposed within said opening for rolling movement over said barrier.

9. A float switch assembly as defined in claim 1 wherein said housing includes internal guide means supporting said shuttle for sliding linear movement within said housing.

10. A float switch assembly as defined in claim 1 and including means for retaining said shuttle in said closed position until said housing is tilted to a predetermined acute angle relative to a horizontal plane.

11. A float switch assembly as defined in claim 1 wherein said electrical conducting element comprises a metal contact element, and said shuttle includes means supporting said contact element for movement with said shuttle and for slight movement relative to said shuttle.

12. A float switch assembly as defined in claim 1 wherein said floating means comprise a hollow float shell surrounding said housing and defining a space therebetween, means for securing said housing to said shell for supporting said housing within said shell, and means connecting said electrical conductors to said shell and forming a fluid-tight seal therebetween.

13. A float switch assembly as defined in claim 12 wherein said shell comprises first and second cup-shaped sections in opposing relation, said housing is mounted on first section of said shell, and means connecting said first and second sections of said shell together and forming a fluid-tight seal therebetween.

14. A float switch assembly adapted to float on a liquid surface and to sense changes in the level of the surface for controlling a pump, said assembly comprising a housing defining a generally cylindrical chamber, means connected to said housing and forming a generally annular barrier projecting into said chamber, a set of electrical conductors extending to said housing, switch means within said housing and connected to said conductors, means for actuating said switch means between a closed position connecting said conductors and an open position disconnecting said conductors, a ball member disposed within said chamber and movable over said barrier to operate said actuating means in response to tilting movement of said housing and independent of the rotational position of said housing, means for floating said housing on the liquid surface, a flexible power cord including said electrical conductors and supporting said floating means for said tilting and rotational movement of said housing [and] , said ball member having a diameter substantially smaller than the diameter of said generally cylindrical chamber , *and said barrier urges said ball member against said actuating means in one of said positions.*

15. A float switch assembly as defined in claim 14 wherein said switch means compise a microswitch disposed within said housing and having a pivotal actuating lever, and said barrier presses said ball member against said lever when said housing is tilted.

16. A float switch assembly as defined in claim 14 wherein said floating means comprise a hollow float shell surrounding said housing, and said shell includes means supporting said housing within said shell.

17. A float switch assembly as defined in claim 14 and including means for tilting said housing after the liquid surface drops substantially below said housing.

[18. A float switch assembly as defined in claim 14 wherein said barrier urges aid ball member against saiad actuating means in one of said positions.]

* * * * *